(12) United States Patent
Tseng et al.

(10) Patent No.: US 8,165,198 B2
(45) Date of Patent: Apr. 24, 2012

(54) APPARATUS AND METHOD FOR PERFORMING VIDEO DECODING PROCESSES IN PARALLEL

(75) Inventors: Shau-Yin Tseng, Hsinchu County (TW); Yi-Hsuan Fan, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 974 days.

(21) Appl. No.: 12/144,653

(22) Filed: Jun. 24, 2008

(65) Prior Publication Data
US 2009/0110316 A1    Apr. 30, 2009

Related U.S. Application Data

(60) Provisional application No. 60/982,726, filed on Oct. 26, 2007.

(51) Int. Cl.
*H04N 11/02* (2006.01)

(52) U.S. Cl. ......... 375/240.01; 375/240.22; 358/426.14; 382/251

(58) Field of Classification Search .................. None
See application file for complete search history.

(56) References Cited

U.S. PATENT DOCUMENTS

| 5,867,601 | A * | 2/1999 | Phillips | 382/250 |
| 2002/0034252 | A1* | 3/2002 | Owen et al. | 375/240.17 |
| 2002/0114395 | A1* | 8/2002 | Owen et al. | 375/240.18 |
| 2003/0118114 | A1* | 6/2003 | Penna | 375/240.25 |
| 2004/0057522 | A1* | 3/2004 | Wu et al. | 375/240.26 |
| 2005/0240870 | A1* | 10/2005 | Aldrich et al. | 715/700 |
| 2006/0165164 | A1* | 7/2006 | Kwan et al. | 375/240.03 |
| 2006/0280245 | A1* | 12/2006 | Wu et al. | 375/240.12 |
| 2007/0291851 | A1* | 12/2007 | Jahanghir et al. | 375/240.26 |
| 2009/0016438 | A1* | 1/2009 | McDade et al. | 375/240.16 |

OTHER PUBLICATIONS

Article titled "Parallel Variable Length Decoding With Inverse Discrete Cosine Transform on VLIW DSP" authored by Tseng, et al., Texas Instruments Incorporated, Application Repost SPRA805, Jun. 2002.

* cited by examiner

*Primary Examiner* — Andrew Lee
(74) *Attorney, Agent, or Firm* — Jianq Chyun IP Office

(57) ABSTRACT

An apparatus and a method for performing video decoding processes in parallel are provided. The method is adapted for utilizing a first cluster and a second cluster of a processor to perform the video data decoding process in parallel. The method includes performing a VLD process to the video data with the first cluster, so as to obtain a plurality of coefficients and then performing an IZ process, an IQ process, and an IDCT process to the coefficients with the second cluster, so as to obtain a plurality of pixels values of the video data. When the first cluster decodes a coefficient of the video data, the second cluster performs the IZ, IQ, and IDCT processes to a coefficient previously decoded by the second cluster of the video data. Accordingly, a parallel process is realized and the decoding speed is increased.

11 Claims, 4 Drawing Sheets

APPARATUS AND METHOD FOR PERFORMING VIDEO DECODING PROCESSES IN PARALLEL

CROSS-REFERENCE TO RELATED APPLICATION

This application claims the priority benefit of U.S.A. provisional application Ser. No. 60/982,726, filed on Oct. 26, 2007. The entirety of the above-mentioned patent application is hereby incorporated by reference herein and made a part of this specification.

BACKGROUND OF THE INVENTION

1. Field of the Invention

The present invention generally relates to apparatus and a method for performing a decoding process, and more particularly, to apparatus and a method for performing vedio decoding process in parallel.

2. Description of Related Art

According to most video standards, e.g., JPEG, MPEG-1, MPEG-2, H.263, the VLD, IZ, IQ, and IDCT processes are required for video decoding. The VLD process is to look up a table according to codewords retrieved from a data stream, so as to decode the codewords and obtain DC or AC coefficients representing the codewords. The IZ process is to arrange the decoded coefficients into an N×N block in an appropriate order. The IQ process is to amplify and recover the decoded coefficients so as to obtain real DC/AC coefficient values. The IDCT process is to transform the N×N block from coefficient values in a frequency domain into pixel values in a space domain. Among all of the above video decoding processes, the VLD and IDCT processes are most time consuming.

In order to improve the decoding efficient according to the aforementioned video decoding characteristics, some algorithms focus on how to improve the method of looking up table with respect to the VLD decoding process or the calculation of the IDCT process. However, although those algorithms may accelerate the decoding speed, the efficiency improved thereby is still not satisfactory.

Another conventional method is to perform the video decoding processes in parallel for shortening the decoding time in accordance with the characteristic that a processor supports a very long instruction word (VLIW), instead of concerning to accelerate the decoding speed. A typical parallel processing structure is usually constructed to perform the VLD, IZ, IQ processes in parallel.

In detail, in a video decoding process, the VLD process is to retrieve codewords from a data stream and decode a set of Run Level values including a Run value and a Level value by looking up an appropriate table, in which the Run value represents an amount of 0 appeared before the coefficient, and the Level value represents a value of the coefficient, and therefore a DC or AC coefficient represented by the codewords can be calculated accordingly.

Taking an 8×8 block as an example, when performing a VLD process and supposing that the data stream is 111011010010..., the first codeword retrieved from the data stream would be 1110. Table 1 as shown below is taken as a reference table to be looked up, so as to obtain a Run value of 2, and a size value of 3 corresponding to the codeword, in which the size value of 3 indicates that the value of the last 3 bits is the Level value. In such a way, the coefficients are obtained as 0, 0, and 6. Next, the second codeword retrieved from the data stream is 100, which can be decoded to obtain a Run value of 1 and a size value of 2, in which the size value of 2 indicates that the value of the last 2 bits is the Level value. Accordingly, the decoded coefficients are increased as 0, 0, 6, 0, 2. Likewise, the decoding process is repeated until the whole 8×8 block, including 1 DC coefficient and 63 AC coefficients, are all decoded. Generally, there are a large amount of combinations of the Run value and Size value, and therefore the reference table usually contains a large amount of data. Moreover, the way to look up coefficients one by one and compare data usually consumes a relatively long time.

TABLE 1

| Run/Size | Codeword |
| --- | --- |
| 0/1 | 00 |
| 0/2 | 010 |
| 1/1 | 011 |
| 1/2 | 100 |
| 2/1 | 101 |
| 2/2 | 110 |
| 2/3 | 1110 |

After the VLD process is completed, the IZ and IQ processes are then performed. A main objective of the IZ process is to distribute VLD coefficients into the 8×8 block according to the corresponding positions in a zig-zag order table. The IQ process is to amplify and recover the VLD coefficients to real DC/AC coefficients according to the corresponding quantization values in a quantization table. The IZ and the IQ processes relate to simple memory access and arithmetic calculation only, which can be completed together in a single step, so as to accelerate the decoding speed and simplify the complexity of program.

As discussed above, the conventional parallel processing structure is to perform the VLD, IZ and IQ processes in parallel, that is, when a cluster of a processor performs a VLD process to an $N^{th}$ coefficient, another cluster of the processor performs an IZ process and an IQ process to the $N-1^{th}$ coefficient, in which N is a positive integer.

For example, FIG. 1 is a schematic diagram illustrating a conventional parallel processing structure for video decoding. FIG. 2 is a schematic diagram illustrating time allocation of the conventional parallel processing structure for video decoding. Referring to FIG. 1 and FIG. 2, in a first stage, cluster 0 firstly decodes a first codeword of the data stream, so as to obtain a Run value and a Level value of the first codeword, and finally provides a calculated coefficient to cluster 1. In the meantime, the cluster 1 has no data for processing, and therefore performs an operation of clearing block.

Then, in a second stage, the cluster 0 decodes a second codeword of the data stream, so as to obtain a Run value and a Level value of the second codeword. In the meantime, the cluster 1 has already obtained the coefficient corresponding to the first codeword from cluster 0, and therefore is subject to perform an IZ process and an IQ process. Because the coefficients obtained by the IZ and IQ processes are coefficient values in a frequency domain, the coefficients are required to be stored in a memory temporarily. When all the coefficients in the 8×8 block have been calculated, the coefficients are processed with the IDCT together, so as to obtain pixel values in a space domain.

As described in the foregoing, although the conventional parallel processing structure is able to achieve the effect of parallel processing so as to accelerate the decoding speed, it still requires a lot of additional time for IDCT process, and therefore the improvement is still limited.

SUMMARY OF THE INVENTION

Accordingly, the present invention generally relates to an apparatus and a method for performing video decoding processes in parallel, in which a VLD process, an IZ process, an IQ process, and an IDCT process are performed in parallel, so as to improve decoding efficiency.

For achieving the foregoing and other objectives, the present invention provides a method for performing video decoding processes in parallel. The method is adapted for utilizing a first cluster and a second cluster of a processor to perform video data decoding processes in parallel. The method includes performing a VLD process to the video data with the first cluster, so as to obtain a plurality of coefficients and then performing an IZ process, an IQ process, and an IDCT process to the coefficients with the second cluster, so as to obtain a plurality of pixels values of the video data. In particular, when the first cluster decodes the $N^{th}$ coefficient of the video data, the second cluster performs IZ, IQ, and IDCT processes to the N-1$^{th}$ coefficient of the video data, in which N is a positive integer.

The exemplary embodiments further provides an apparatus for performing video decoding processes in parallel. The apparatus includes a first cluster and a second cluster. The first cluster is adapted for performing a VLD process to video data, so as to obtain a plurality of coefficients. The second cluster is adapted for performing an IZ process, an IQ process, and an IDCT process to the coefficients so as to obtain a plurality of pixel values of the video data. When the first cluster is utilized to decode the $N^{th}$ coefficient of the video data, the second cluster is utilized to perform the IZ, IQ, and IDCT processes to the N-1$^{th}$ coefficient, in which N is a positive integer.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
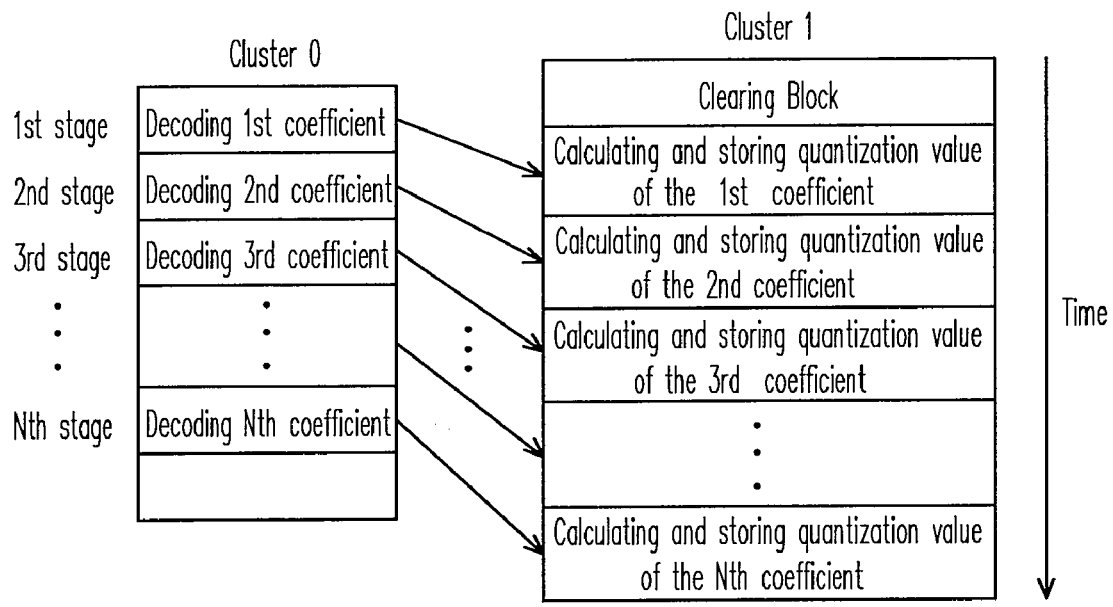
FIG. 1 is a schematic diagram illustrating a conventional parallel processing structure for video decoding.

Reference will now be made in detail to the present preferred exemplary embodiments of the invention, examples of which are illustrated in the accompanying drawings. Wherever possible, the same reference numbers are used in the drawings and the description to refer to the same or like parts.

According to an exemplary embodiment of the present invention, a JPEG decoder is used to decode an 8×8 block, in which only when the whole 8×8 block is processed with a variable length decode (VLD) process, an inverse zig-zag (IZ) process, and an inverse quantization (IQ) processes, an inverse discrete cosine transform (IDCT) is then performed to the 8×8 block. A main objective of the IDCT process is to transform an 8×8 coefficient block (including a DC coefficient and 63 AC coefficients) into an 8×8 pixel block (including 64 pixel values). This is subject to the so-called transformation from a frequency domain to a space domain. An original IDCT equation is as follows:

$$f(x, y) = \frac{2}{N}\sum_{u=0}^{N-1}\sum_{v=0}^{N-1} C(u)\cdot C(v)\cdot F(u, v)\cdot \cos\frac{(2x+1)u\pi}{2N}\cdot \cos\frac{(2y+1)v\pi}{2N} \quad (1)$$

in which F represents the 8×8 coefficient block, f represents the 8×8 pixel block, while C(x) is defined by:

$$C(x) = \begin{cases} \frac{1}{\sqrt{2}} & \text{if } x = 0 \\ 1 & \text{otherwise} \end{cases}$$

Since the original IDCT equation includes some complex arithmetic calculations, a simplified IDCT equation as given below is used for decreasing the calculation load and improving the effectiveness of IDCT process:

$$f(x,y) = C^T \cdot F(u,v) \cdot C \quad (2)$$

in which C is a matrix defined as:

$$C = \begin{bmatrix} a & a & a & a & a & a & a & a \\ b & d & e & g & -g & -e & -d & -b \\ c & f & -f & -c & -c & -f & f & c \\ d & -g & -b & -e & e & b & g & -d \\ a & -a & -a & a & a & -a & -a & a \\ e & -b & g & d & -d & -g & b & -e \\ f & -c & c & -f & -f & c & -c & f \\ g & -e & d & -b & b & -d & e & -g \end{bmatrix}$$

$$[a\ b\ c\ d\ e\ f\ g] = \frac{1}{2}\begin{bmatrix} \cos[\frac{\pi}{4}] \\ \cos[\frac{\pi}{16}] \\ \cos[\frac{\pi}{8}] \\ \cos[\frac{3\pi}{16}] \\ \cos[\frac{5\pi}{16}] \\ \cos[\frac{3\pi}{8}] \\ \cos[\frac{7\pi}{16}] \end{bmatrix}$$

As such, when using the equation (2) to perform the IDCT process, the IDCT process requires to do simple read, multiplication, and addition processes to the matrix, and therefore the calculation load is effectively reduced. Regarding the whole video decoding process in general, the VLD process requires a relatively large amount of calculation including finding out an address of the reference table, sequentially looking up and comparing coefficients, and retrieving the Run Level values, while the rest decoding processes, i.e., IZ, IQ, and IDCT processes, relate to simple memory access or arithmetic calculation only. As such, it is reasonable to perform the video decoding processes in parallel considering the time allocation.

Accordingly, a principle of the present invention is: when a decoder is constructed upon a very long instruction word (VLIW) structure, and when a cluster 0 performs a VLD process to the $N^{th}$ coefficient, a cluster 1 is used to perform calculations including IZ, IQ, and IDCT processes to the $N-1^{th}$ coefficient. Because the cycles spent by the IZ, IQ and IDCT processes are less than those of the VLD process, the parallel processing structure is adapted to integrate all of the VLD, IZ, IQ, and IDCT processes for processing together and consume only about the processing time of the VLD process plus the calculation time of a first coefficient and a last coefficient. An exemplary embodiment of the present invention is given below for illustrating a method for performing video decoding processes in parallel according to the aforementioned principle.

Figure 3:
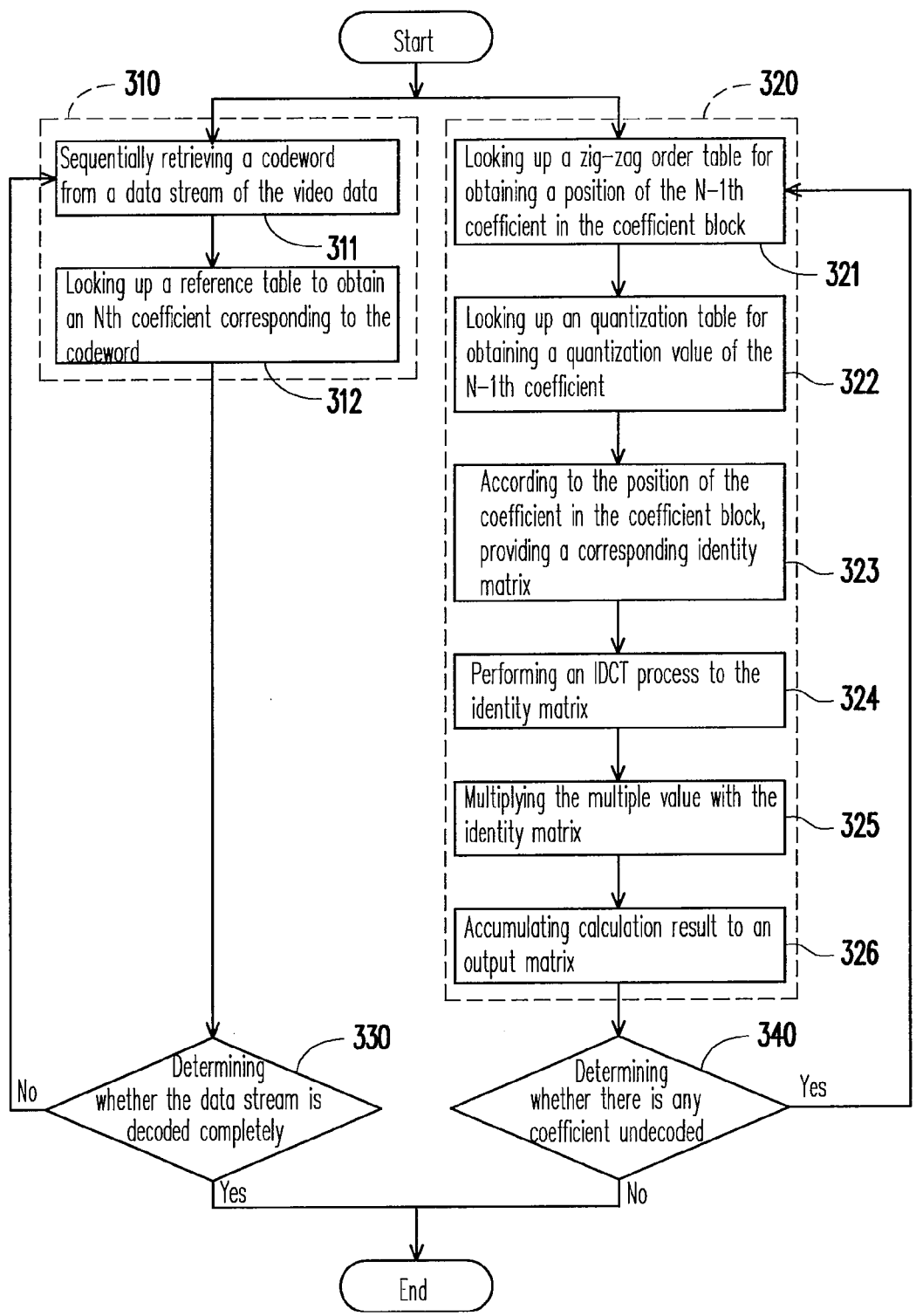
FIG. 3 is a flow chart illustrating a method for parallel performing decoding processes according to an exemplary embodiment of the present invention.

FIG. 3 is flowchart illustrating a method for performing video decoding processes in parallel according to an exemplary embodiment of the present invention. Referring to FIG. 3, the present exemplary embodiment is adapted for utilizing a first cluster and a second cluster of a processor to process video data in parallel. The processor is, for example, a digital signal processor (DSP) supporting a very long instruction word (VLIW) structure. The video data can be, but is not limited to, image files or video files of JPEG, MPEG-1, MPEG-2, and H.263.

Figure 2:
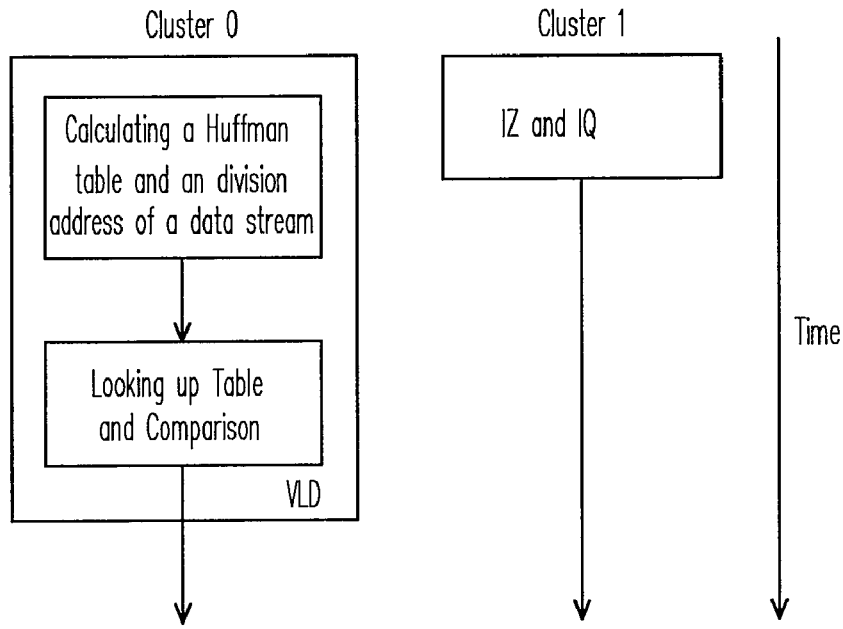
FIG. 2 is a schematic diagram illustrating time allocation of the conventional parallel processing structure for video decoding of FIG. 1.

As shown in FIG. 3, a step S310 and a step S320 are performed at the same time. In step S310, the first cluster is used to perform a VLD process to the video data so as to obtain a plurality of coefficients. The step S310 may be further divided into a plurality of sub-steps. At sub-step S311, a codeword is sequentially retrieved from a data stream of the video data. Then, at sub-step S312, a predetermined reference table is looked up to obtain an $N^{th}$ coefficient corresponding to the codeword. In detail, a set of Run Level values, which includes a Run value and a Level value, can be obtained by looking up the reference table. The Run value represents an amount of 0 appeared before the coefficient, and the Level value represents a value of the coefficient. The aforesaid VLD process is similar to the exemplary embodiment as discussed in FIG. 1 and FIG. 2, such that the related description will not be iterated hereby.

On the other hand, at step S320, the second cluster is used to perform the IZ, IQ, and IDCT processes to an $N-1^{th}$ coefficient outputted from the first cluster, so as to obtain a plurality of pixel values, in which N is a positive integer. It should be noted that according to the current embodiment, when the first cluster performs the decoding process to the $N^{th}$ coefficient of the video data, the second cluster performs the IZ, IQ, and IDCT decoding processes to the $N-1^{th}$ coefficient of the video data which has been previously processed by the first cluster. Further, when the first cluster performs the decoding process to a first coefficient, the second cluster has no data for processing, and therefore the second cluster performs an operation of clearing block.

The step S320 can be divided into a plurality of sub-steps. At sub-step S321, when receiving the $N-1^{th}$ coefficient form the first cluster, the second cluster looks up a zig-zag order table for obtaining a position of the $N-1^{th}$ coefficient in the coefficient block, and at sub-step S322, looks up the quantization table for obtaining a quantization value of the $N-1^{th}$ coefficient. When the IZ and IQ processes are completed, the IDCT process is going to be performed next.

However, the conventional IDCT decoding process is performed with regard to the entire coefficient block, while each performance of the VLD decoding process obtains only one coefficient. As such, to perform the IDCT process to the individual coefficient, the equation for IDCT process is required to be modified, so as to integrate the IDCT process into the parallel processing structure of the present invention and thus.

Accordingly, at sub-step S323, the present invention provides a corresponding identity matrix according to the position of the coefficient in the coefficient block, and at sub-step S324, performs an IDCT process with regard to the identity matrix and provides the processed identity matrix to the second cluster for further calculation. After obtaining the multiple value, at sub-step S325, the second cluster multiplies the multiple value with the identity matrix, which is processed with the IDCT process. At sub-step S326, the final result of the foregoing calculation is taken as a part of the decoding result of the video data, and added to an output matrix representing the decoding result of the video data.

It should be noted herein that in the present exemplary embodiment, after the first cluster performs the VLD process to the $N^{th}$ coefficient at the step S310, at step S330, it further checks whether the data stream of the video data is not yet decoded. If the data stream of the video data is not yet completely decoded, the steps of the VLD process are repeated to continuously retrieve the rest codewords for decoding until the data stream are completely decoded, so as to obtain the rest coefficients. On the other hand, when the second cluster performs the IZ, IQ, and IDCT processes at step S320, it also checks whether there is any coefficient undecoded at step S340. If there is any undecoded coefficient, the foregoing steps of IZ, IQ, and IDCT processes are repeated to process the rest coefficients, and the result is accumulated to the output matrix. After all coefficients are decoded, the value of the accumulated output matrix is the pixel values of the decoded video data.

It should be noted herein that in the step of performing the IDCT process, the IDCT process should be performed with regard to each of the coefficients in the coefficient block. The present exemplary embodiment adopts the following equation:

$$f = w_{11} \cdot g_{11} + w_{12} \cdot g_{12} + w_{13} \cdot g_{13} + \ldots + w_{ij} \cdot g_{ij} \qquad (3)$$

in which f represents the output matrix, $w_{ij}$ represents the multiple values obtained by multiplying the coefficients with the quantization value, $g_{ij}$ represents the identity matrix corresponding to each of the coefficients and processed with the IDCT process, in which i, j are positive integers. In detail, whenever the second cluster obtains a multiple value $w_{ij}$, the multiple value $w_{ij}$ is multiplied with the corresponding identity matrix $g_{ij}$, and the calculation result is then accumulated to the output matrix f After all coefficients are processed with the foregoing multiplying and adding calculation, the values of the output matrix f are the decoding result of the video data.

It should be noted that the foregoing equations are given with respect to a coefficient block having a specific size for convenience of illustration. However, for coefficient blocks having different sizes, the equations should be modified correspondingly.

According to an exemplary embodiment of the present invention, for using an JPEG decoder to decode an 8×8 block, the IDCT process is performed to an 8×8 coefficient block, so that the IDCT equation should be modified to a format in correspondence with the 8×8 coefficient block, so as to integrate the IDCT process into the parallel processing structure. For example, an 8×8 matrix F can be factorized as:

$$F = w_{11} \cdot G_{11} + w_{12} \cdot G_{12} + w_{13} \cdot G_{13} + \ldots + w_{88} \cdot G_{88} \qquad (4),$$

in which $G_{ij}$ represents an identity matrix, and $w_{ij}$ represents the multiple value of the identity matrix, which is defined as:

$$G_{11} = \begin{bmatrix} 1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix},$$

$$G_{12} = \begin{bmatrix} 0 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}, \ldots,$$

$$G_{88} = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 1 \end{bmatrix},$$

Then, by calculating equation (2) according to equation (4), following result can be obtained:

$$\begin{aligned} f &= C^T \cdot F \cdot C \quad (5) \\ &= C^T \cdot (w_{11} \cdot G_{11} + w_{12} \cdot G_{12} + w_{13} \cdot G_{13} + \ldots + w_{88} \cdot G_{88}) \cdot C \\ &= w_{11} \cdot C^T \cdot G_{11} \cdot C + w_{12} \cdot C^T \cdot G_{12} \cdot C + w_{13} \cdot C^T \cdot G_{13} \cdot \\ &\quad C + \ldots + w_{88} \cdot C^T \cdot G_{88} \cdot C \\ &= w_{11} \cdot g_{11} + w_{12} \cdot g_{12} + w_{13} \cdot g_{13} + \ldots + w_{88} \cdot g_{88} \end{aligned}$$

Therefore, it can be known from above deduction that to perform the IDCT process to an 8×8 matrix F is equivalent to perform the IDCT process to each of identity matrixes $G_{ij}$ of F. The result of decoding the JPEG image data can be obtained by multiplying the matrixes $g_{ij}$, which is processed with the IDCT process, with the multiple values of the identity value $w_{ij}$, and adding all of the products.

By using the foregoing equations for performing the IDCT process to an individual coefficient, the present invention is adapted to performing the VLD, IZ, IQ, and IDCT processes in parallel. In other words, whenever the first cluster obtains a coefficient, the coefficient can be provided to the second cluster for processing. Therefore, when the first cluster proceeds to decode a next coefficient, the second cluster can synchronously perform the IZ, IQ, and IDCT processes to the previously obtained coefficient, and thus achieving the effectiveness of parallel processing.

Figure 4:
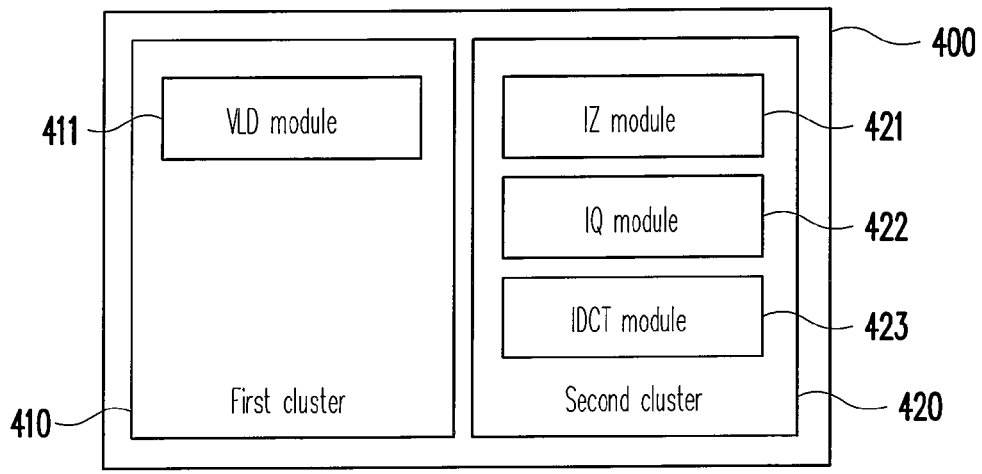
FIG. 4 is a block diagram illustrating an apparatus for parallel performing decoding processes according to an exemplary embodiment of the present invention.

Further, the present invention includes providing an entity to realize the foregoing method of parallel processing. FIG. 4 is a block diagram illustrating an apparatus for performing the video decoding processes in parallel according to an embodiment of the present invention. Referring to FIG. 4, the apparatus 400 for performing the video decoding processes in parallel includes a first cluster 410, and a second cluster 420. The apparatus 400 is, for example, but not limited to, a digital signal processor (DSP) supporting a very long instruction word (VLIW) structure.

The first cluster 410 is adapted to perform a VLD process to video data so as to obtain a plurality of coefficients. The first cluster 410 further includes a VLD module 411 for sequentially retrieving codewords from a data stream of the video data, and looking up a reference table for obtaining the coefficients corresponding to the codewords.

The second cluster 420 is adapted for performing the IZ, IQ, and IDCT processes to each coefficient obtained by the first cluster 410. The second cluster 420 includes an IZ module 421, an IQ module 422, and an IDCT module 423. The IZ module 421 is adapted for looking up a zig-zag order table so as to obtain a position of each coefficient outputted by the first cluster in the coefficient block. The IQ module 422 is adapted for looking up a quantization table to obtain a quantization value corresponding to the coefficient. The IDCT module 423 is adapted for multiplying the coefficient with the quantization value to obtain a multiple value, and multiplying the multiple value with an IDCT processed identity matrix, and adding the calculation result to an output matrix.

It should be noted that when the first cluster 410 is utilized to decode the $N^{th}$ coefficient of the video data, the second cluster 420 is utilized to perform the IZ, IQ, and IDCT processes to the $N-1^{th}$ coefficient, in which N is a positive integer. In such a way, the apparatus 400 can achieve parallel processing. The processing methods of the VLD, IZ, IQ, and IDCT processes are described in the exemplary embodiments as discussed above, and therefore the details will not be iterated hereby.

Figure 5:
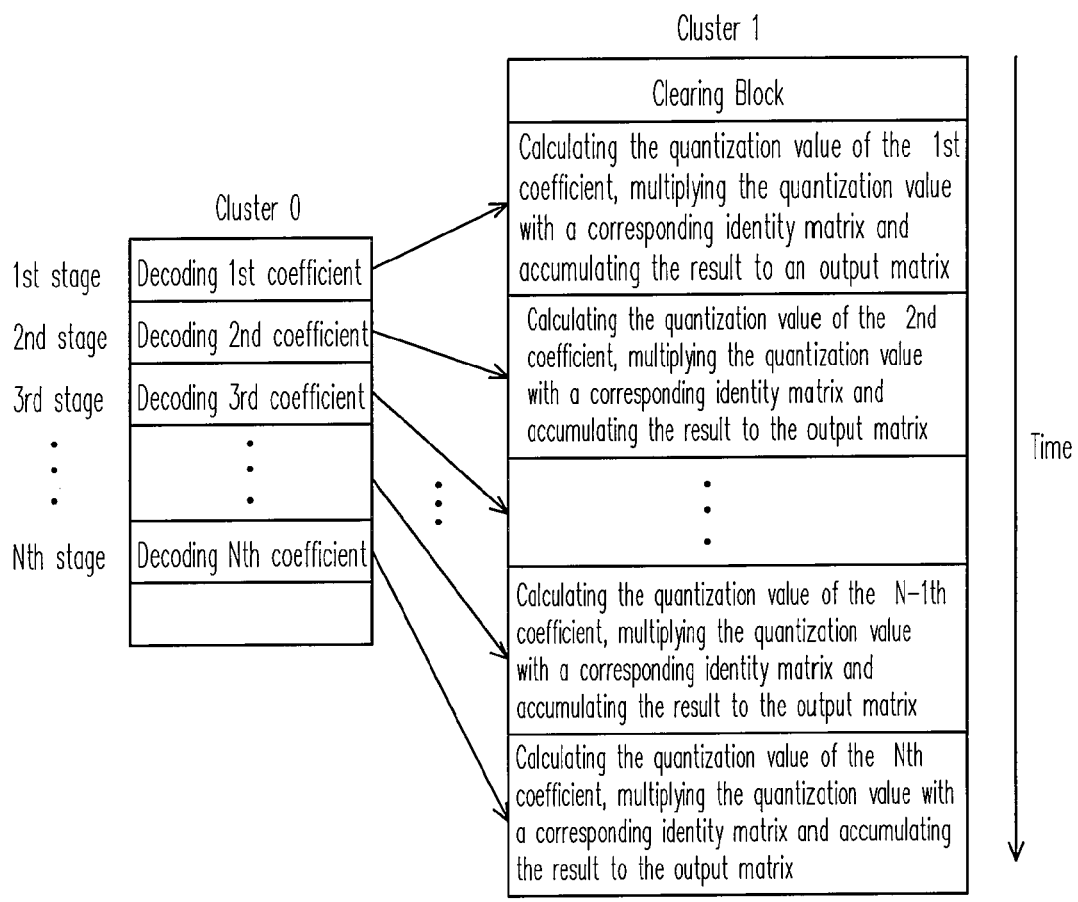
FIG. 5 is a schematic diagram illustrating a parallel processing structure for video decoding according to an exemplary embodiment of the present invention.
Figure 6:
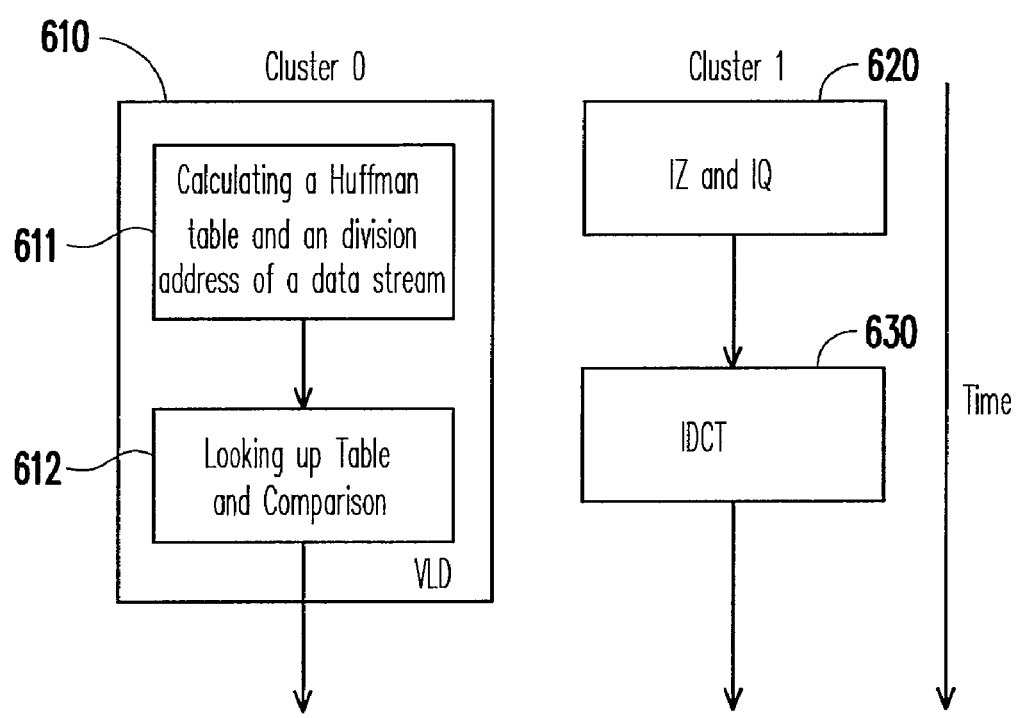
FIG. 6 illustrates time allocation of the parallel processing structure for video decoding of FIG. 5 according to the exemplary embodiment of the present invention.

According to the structure of the parallel processing apparatus 400, the process of the method for performing the video decoding processes in parallel can be better understood and an exemplary embodiment is given below for further illustration. FIG. 5 is a schematic diagram illustrating a parallel processing structure for video decoding according to an exemplary embodiment of the present invention. FIG. 6 is a schematic diagram illustrating time allocation of the parallel processing structure for video decoding according to the exemplary embodiment of the present invention. Referring to FIGS. 5 and 6 together, in the first stage, a cluster 0 performs a VLD process to a first codeword, so as to obtain a coefficient of the first codeword. In the meantime, since there is no data for a cluster 1 to process in the first stage, the cluster 1 performs an operation of clearing block.

As shown in FIG. 6, at step S610, the cluster 0 performs a VLD process, which includes calculating a Huffman table and a division address of a data stream at sub-step S611, and then looking up a table and comparing the result, so as to provide the calculated coefficient to the cluster 1 at sub-step S612.

Referring to FIG. 5 again, in the second stage, the cluster 0 performs a VLD process to a second codeword in a similar way, so as to obtain a coefficient of the second codeword. Meanwhile, because the first cluster has already retrieved the coefficient of the first codeword, the coefficient can be further processed by the IZ, IQ, and IDCT processes.

As shown in FIG. 6, the steps for the cluster 1 to perform the IZ, IQ, and IDCT processes includes performing the IZ and IQ processes at step 620, and thereafter performing the IDCT process at step 630.

As shown in FIG. 5, in subsequential steps, the method for parallel processing according to the present invention sustains to use the cluster 0 for decoding VLD coefficients, and use the cluster 1 for performing the IZ, IQ, and IDCT processes to the immediate prior coefficient until all of the coefficient are obtained and transformed into pixel values, such that a final decoding result of the video data is then obtained.

In order to verify the feasibility and correctness of the foregoing equations, a further embodiment is given below. The embodiment performs an IDCT process to a practical coefficient block according to the foregoing equations, so as to make the calculation process of the present invention clearer and more definite.

Table 2 shows a matrix of an 8×8 coefficient block, and Table 3 is a matrix of an 8×8 pixel block obtained by performing an IDCT process to the coefficient block of Table 2 using conventional equations.

TABLE 2

| 90 | 35 | 0 | 0 | 0 | 0 | 0 | 0 |
|---|---|---|---|---|---|---|---|
| −2 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

TABLE 3

| 17 | 16 | 14 | 12 | 10 | 7 | 6 | 5 |
|---|---|---|---|---|---|---|---|
| 17 | 16 | 14 | 12 | 10 | 8 | 6 | 5 |
| 17 | 16 | 15 | 12 | 10 | 8 | 6 | 5 |
| 17 | 16 | 15 | 12 | 10 | 8 | 6 | 5 |
| 17 | 16 | 15 | 13 | 10 | 8 | 6 | 5 |
| 17 | 17 | 15 | 13 | 10 | 8 | 6 | 5 |
| 17 | 17 | 15 | 13 | 10 | 8 | 6 | 5 |
| 17 | 17 | 15 | 13 | 10 | 8 | 6 | 6 |

When taking Table 2 as the input of the IDCT process of the present invention, multiple values $w_{11}, w_{12}, w_{13}$ are obtained respectively as 90, 35, −2. Further, according to the position of each of the coefficients in the coefficient block, the identity matrixes $g_{11}, g_{12}, g_{21}$ after the IDCT process provided by the present invention are respectively listed as Table 4, Table 5, and Table 6.

TABLE 4

| 32 | 32 | 32 | 32 | 32 | 32 | 32 | 32 |
|---|---|---|---|---|---|---|---|
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |

TABLE 5

| 44 | 38 | 25 | 9 | −9 | −25 | −38 | −44 |
|---|---|---|---|---|---|---|---|
| 44 | 38 | 25 | 9 | −9 | −25 | −38 | −44 |
| 44 | 38 | 25 | 9 | −9 | −25 | −38 | −44 |
| 44 | 38 | 25 | 9 | −9 | −25 | −38 | −44 |
| 44 | 38 | 25 | 9 | −9 | −25 | −38 | −44 |
| 44 | 38 | 25 | 9 | −9 | −25 | −38 | −44 |
| 44 | 38 | 25 | 9 | −9 | −25 | −38 | −44 |
| 44 | 38 | 25 | 9 | −9 | −25 | −38 | −44 |

TABLE 6

| 44 | 44 | 44 | 44 | 44 | 44 | 44 | 44 |
|---|---|---|---|---|---|---|---|
| 38 | 38 | 38 | 38 | 38 | 38 | 38 | 38 |
| 25 | 25 | 25 | 25 | 25 | 25 | 25 | 25 |
| 9 | 9 | 9 | 9 | 9 | 9 | 9 | 9 |
| −9 | −9 | −9 | −9 | −9 | −9 | −9 | −9 |
| −25 | −25 | −25 | −25 | −25 | −25 | −25 | −25 |
| −38 | −38 | −38 | −38 | −38 | −38 | −38 | −38 |
| −44 | −44 | −44 | −44 | −44 | −44 | −44 | −44 |

For convenience of calculation, the matrixes $g_{11}, g_{12}, g_{21}$ of Tables 4, 5 and 6 are all previously amplified for 256 times. In the next step, the matrixes $g_{11}, g_{12}, g_{21}$ are respectively multiplied with the corresponding multiple values $w_{11}, w_{12}, w_{21}$, the results are accumulated and then divided by 256, and a final result as shown in Table 7 is obtained.

TABLE 7

| 17 | 16 | 14 | 12 | 10 | 7 | 6 | 5 |
|---|---|---|---|---|---|---|---|
| 17 | 16 | 14 | 12 | 10 | 8 | 6 | 5 |
| 17 | 16 | 14 | 12 | 10 | 8 | 6 | 5 |
| 17 | 16 | 15 | 12 | 10 | 8 | 6 | 5 |
| 17 | 16 | 15 | 13 | 10 | 8 | 6 | 5 |
| 17 | 17 | 15 | 13 | 10 | 8 | 6 | 5 |
| 18 | 17 | 15 | 13 | 10 | 8 | 6 | 6 |
| 18 | 17 | 15 | 13 | 10 | 8 | 6 | 6 |

Comparing Table 3, which shows the decoding result when using the original IDCT equations, with Table 7, which shows the decoding result when using the modified IDCT equations, it can be known that the modified IDCT equations are not only adapted for accelerating the parallel processing structure, but also generates very small errors.

In summary, the present invention modifies the conventional parallel processing structure, and performs VLD, IZ, IQ, and IDCT processes in parallel. When a cluster of a processor performs a VLD process to the $N^{th}$ coefficient, another cluster performs IZ, IQ, and IDCT processes to the $N-1^{th}$ coefficient. With such a parallel processing structure, the whole process of decoding steps can be completed within the time for looking up the table in the VLD process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for performing video decoding processes in parallel, adapted for utilizing a first cluster and a second cluster of a processor to process a video data in parallel, the method comprising:
    performing a variable length decoding (VLD) process to the video data with the first cluster, so as to obtain a plurality of coefficients, comprising:
        sequentially retrieving codewords from a data stream of the video data; and
        looking up a reference table to obtain coefficients corresponding to the codewords;
    performing an inverse zig-zag (IZ) process, an inverse quantization (IQ) process, and an inverse discrete cosine transform (IDCT) process to each the coefficients with the second cluster, so as to obtain a plurality of pixel values of the video data, wherein
    when the first cluster decodes the $N^{th}$ coefficient of the video data, the second cluster performs the IZ, IQ, and IDCT processes to the N−1$^{th}$ coefficient of the video data, wherein N is a positive integer;

utilizing the first cluster for determining whether the data stream of the video data is completely decoded; and if the data stream of the video data is not yet completely decoded, the foregoing steps for decoding is repeated to retrieve the rest codewords of the data stream for decoding until the data stream is completely decoded so as to obtain the rest coefficients.

2. The method according to claim 1, wherein the step of performing a VLD process to the video data with the first cluster further comprises:

outputting the obtained coefficients so as to provide the coefficients for the second cluster to perform the IZ, IQ, and IDCT processes.

3. The method according to claim 2, wherein the step of performing the IZ, IQ, and IDCT processes to the coefficients with the second cluster further comprises:

looking up a zig-zag order table to find out a corresponding position of the coefficient outputted by the first cluster in the coefficient block;

looking up a quantization table to find out a quantization value of the coefficient; and multiplying the coefficient with the quantization value to obtain a multiple value; and multiplying the multiple value with an identity matrix which has been processed with the IDCT process, and adding the product of the multiplication to an output matrix.

4. The method according to claim 3, wherein prior to the step of multiplying the multiple value to the identity matrix, the method further comprises:

providing a corresponding identity matrix according to the position of the coefficient in the coefficient block; and performing the IDCT process to the identity matrix and providing the processed identity matrix to the second cluster for further calculation.

5. The method according to claim 3, wherein the step of performing the IZ, IQ, and IDCT processes to the coefficients with the second cluster further comprises:

determining whether all of the coefficients are decoded;

if there is any coefficient not yet decoded, repeating the foregoing steps of IZ, IQ and IDCT processes to process the rest coefficients and adding the result to the output matrix; and if all of the coefficients are decoded, outputting the accumulated output matrix.

6. The method according to claim 5, wherein the values in the accumulated output matrix are the pixel values of the decoded video data.

7. The method according to claim 3, wherein the step of performing the IDCT process to the coefficients with the second cluster further comprises performing the IDCT process to each of the coefficients in the coefficient block, wherein the output matrix is obtained by multiplying the multiple value which is obtained by multiplying the coefficients and the quantization value, with the identity matrixes corresponding to the coefficients.

8. The method according to claim 7, wherein the coefficient block is an N×N coefficient block.

9. The method according to claim 1, wherein the processor comprises a digital signal processor (DSP) supporting a very long instruction word (VLIW) structure.

10. An apparatus for performing video decoding processes in parallel, comprising:

a first cluster, adapted for performing a variable length decoding (VLD) process to video data, so as to obtain a plurality of coefficients; and a second cluster, adapted for performing an inverse zig-zag (IZ) process, an inverse quantization (IQ) process, and an inverse discrete cosine transform (IDCT) process to the coefficients so as to obtain a plurality of pixel values of the video data, comprising:

an IZ module, adapted for looking up a zig-zag order table to obtain a position of the coefficient outputted by the first cluster in the coefficient block;

an IQ module, adapted for looking up a quantization table to obtain a quantization value corresponding to the coefficient; and an IDCT module, adapted for multiplying the coefficient with the quantization value to obtain a multiple value, and multiplying the multiple value with an identity matrix which is processed with the IDCT process, and adding the calculation result to an output matrix, wherein when the first cluster is utilized to decode the N$^{th}$ coefficient of the video data, the second cluster is utilized to perform the IZ, IQ, and IDCT processes to the N−1$^{th}$ coefficient, wherein N is a positive integer.

11. The apparatus according to claim 10, wherein the first cluster comprises:

a VLD module, adapted for sequentially retrieving codewords from a data stream of the video data, and looking up a reference table for obtaining the coefficients corresponding to the codewords.

\* \* \* \* \*